Figure 7:
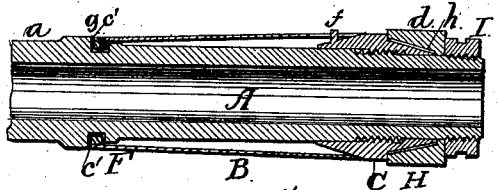
Figure 8:

J. BOWLES.
Fire-Arms.
No. 213,616. Patented Mar. 25, 1879.
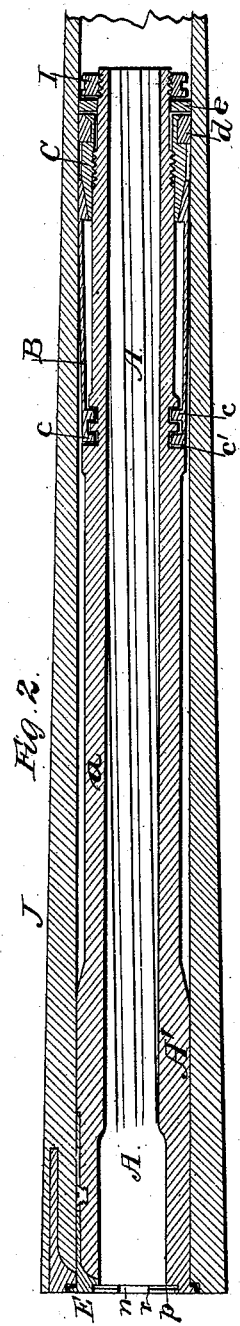
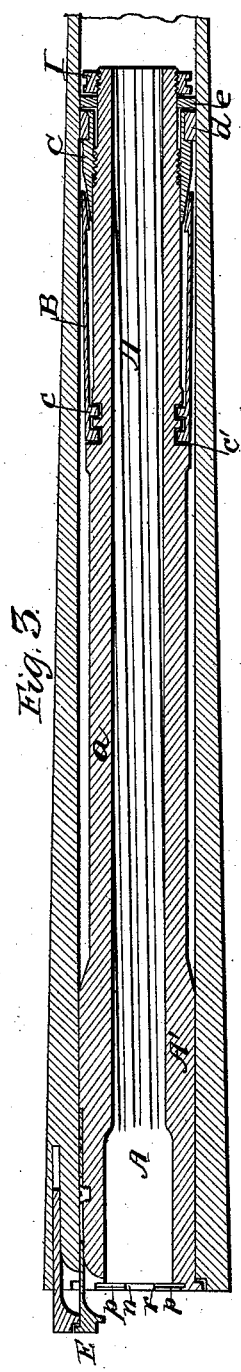
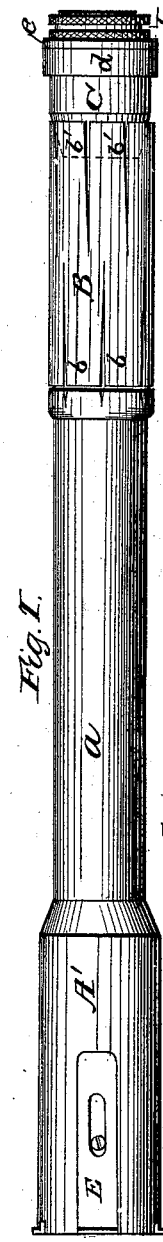
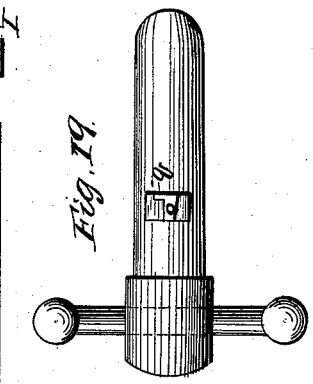
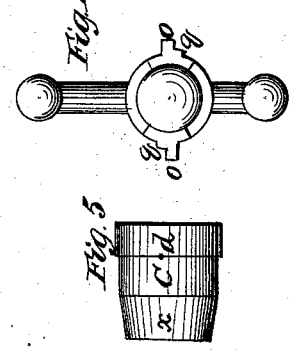
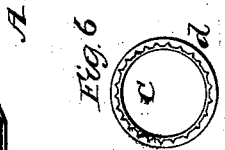
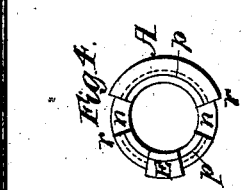
Attest:
F. B. Brock.
D. P. Cowl
Inventor:
John Bowles
by J. Hannay
Atty 2 Sheets—Sheet 2.

J. BOWLES.
Fire-Arms.

No. 213,616. Patented Mar. 25, 1879.

Attest:
T. B. Brock
D. P. Cowl

Inventor:
John Bowles
by P. Hannay
Atty.

N. PETERS, PHOTO-LITHOGRAPHER, WASHINGTON, D. C.

UNITED STATES PATENT OFFICE.

JOHN BOWLES, OF WASHINGTON, DISTRICT OF COLUMBIA, ASSIGNOR, BY MESNE ASSIGNMENT, TO BOWLES EXTRA RIFLE COMPANY, OF SAME PLACE.

IMPROVEMENT IN FIRE-ARMS.

Specification forming part of Letters Patent No. 213,616, dated March 25, 1879; application filed April 3, 1878.

*To all whom it may concern:*

Be it known that I, JOHN BOWLES, of Washington, in the county of Washington and District of Columbia, have invented certain new and useful Improvements in Fire-Arms; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates to that class of improvements in breech-loading guns in which short small barrels, either rifled or smooth-bored, are inserted, so as to convert the arm from a shot-gun to a rifle, or from a shot-barrel of large caliber to one of a small, or vice versa, as the exigency of the case may require.

The invention consists, first, in the mode of constructing the short barrel, by means of which, while being easy to insert and withdraw, it is, once inserted, held firmly and securely in place during the operation of withdrawing a cartridge or cartridge-shell; secondly, in a new mode of combining the short or removable barrel with the ordinary barrel of a breech-loading shot-gun; thirdly, in a new and improved mode of preventing the escape of the gases through the breech in using the short barrel with the larger one; fourthly, in a new and improved mode of withdrawing the short barrel from the larger one.

Figure 1, Sheet 1, represents my short barrel ready for insertion into the larger one. Fig. 3 represents it fully inserted, with the cartridge-extractors of both barrels extended, but the small barrel not yet locked to the large one. Fig. 2 represents it fully inserted and firmly locked to the interior of the larger barrel. Fig. 4 represents the rear end of the small barrel and the end of its extractor E.

That portion of the short barrel marked A', Fig. 1, is made to fill the cartridge-chamber of the larger barrel, but small enough to enter the same easily, while the parts $a$ and B nearly fill the bore forward of the chamber transversely. B represents a slotted expanding ring, to be forced out against the interior periphery or wall of the larger barrel by an opposite cone, C, operated by a screw-thread cut upon the barrel, and more particularly shown in Figs. 2 and 3.

$b\ b$, Fig. 1, represent slots cut in the expanding ring to allow the ribs $c$, on its end next to the breech of the gun, to expand and jump over into a groove or grooves, $c'$, cut in the barrel, and shown in Figs. 2 and 3, and $b'\ b'$ similar slots in its other end to allow that end to be expanded when required, and to spring back again when relieved. By this construction the ring is easily inserted into the large barrel before being expanded by the movable cone, after which it is expanded by turning the short barrel, the cone meanwhile being prevented from revolving by the use of an india-rubber or other elastic packing, which presses against the interior of the large gun-barrel, and which, for this purpose, is attached to its base. The movable cone C for this purpose is provided with a female screw-thread on its interior, into which the male screw-thread on the periphery of the small barrel works, so as to move the cone back and forth, and thereby expand the ring against the larger barrel, or else to allow it to collapse and relieve it from pressure, as the case may be. This conical nut C and its rubber or other packing $d$ is shown in the detail views, Figs. 5 and 6, and in section in Figs. 2 and 3. The conical portion $x$ of this nut C answers the following purposes: first, of centering the small-bored barrel in the axis of the larger barrel; secondly, of strengthening the small barrel and preventing any shaking motion at its front end on firing the gun; thirdly, in bringing metal to metal from the inside bore of the small barrel to the inside bore of the larger one, independent of the packing upon the base of the nut, thus giving stability to the barrel and invariable accuracy to the flight of a projectile; fourthly, firmly holding the small barrel in the larger one while its cartridge or cartridge-shell is being extracted, and which is effected by the action of the extractor of the large barrel acting upon the extractor placed in the small barrel, as shown more clearly in Fig. 3, at E.

The extraction of the cartridge case or shell requires the firm gripe of the expanding ring to resist the action of the extractor, especially when the shell sticks or becomes jammed in the gun, and which frequently occurs.

Besides the packing-ring $d$ upon the base of the conical nut C, which prevents the gases of the charge from passing down between the inside of the large barrel and the outside of the small one, and which holds the conical nut firmly in place while the small barrel is being turned, there is another elastic ring, $e$, forward of the said nut C, which presses upon the small barrel and also back upon the nut, so that no gas can pass back between the nut and the small barrel. This ring is shown in Figs. 1, 2, and 3.

Fig. 4 represents the rear end of a short gun-barrel, with notches or recesses $n$ cut in dovetailed form through that portion of it which enters the cartridge-flange seat in the larger barrel. These notches $n$ are to permit the entrance of the lugs $o$ $q$ upon the hand-wrench, Figs. 18 and 19, which is used in the insertion and extraction of the small barrels.

The dovetailed or undercut portion is not shown in Fig. 4, but its form corresponds with the lower line of the lug $o$ upon the wrench, (shown under O in Fig. 19,) and is for the purpose of preventing the slipping out of the wrench while the small barrel is being screwed into the conical nut.

An internal groove, $p$, is turned out in the cartridge-flange seat of the small barrel nearly to the depth of the dotted lines in Fig. 4, and sufficient to admit the two opposite lugs $q$ upon the wrench, Figs. 18 and 19, to enter and firmly lock the wrench to the small barrel at the time it is used to unscrew the same from the conical nut to withdraw the smaller barrel from the larger one.

By the dovetailed locking of the wrench in the short barrel while screwing it into the larger one the wrench comes out easily by a straight backward pull, leaving the small barrel in its proper place, while, if it be desired to remove the small barrel from the large one, the wrench is inserted and turned to the left, which pushes the lugs $q$, Figs. 18 and 19, into the grooves $p$ in the cartridge-flange seat, while that portion of the lugs opposite to the dovetailed face, Fig. 19, comes in contact with shoulders $r$ in the end of the barrel, Fig. 4, so that the mere act of unscrewing the short barrel with this wrench firmly locks the wrench to it, and thus the operator, turning the wrench to the left and afterward pulling back, removes the small barrel from the larger one.

In the construction shown in Figs. 2 and 3, the expanding ring B is so arranged that the end of the small barrel will revolve inside of it. This ring is connected to the barrel A by means of one or more ribs, $c$ $c$, turned or formed on its inside, which take into grooves $c'$ $c'$ turned in the short barrel A. But it is evident that if found desirable in practice, this whole device for the purposes above described may be variously modified without materially changing the principle of its operation.

Several of such modifications are shown upon Sheet 2 of the drawings.

Figs. 7, 8, 9, 10, and 11 show one of them. In this modification the expanding ring B is prevented from longitudinal motion by one or more screws, $g$, which, passing through the ring B, enter into ring F, arranged in the groove $c'$ in the barrel.

Figure 16:
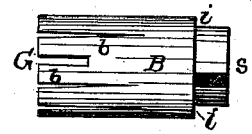

The expanding ring and conical nut, in this modification, are connected together by a pin, $f$, made fast to the cone C and passing through one of the slots G, and which, for this purpose, is formed in the manner shown in Fig. 16.

Figure 9:
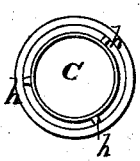
Figure 10:

Instead of two packing-rings, $d$ and $e$, as described in the first combination, we here have only one, (shown at $d$ H, Figs. 7 and 8,) and which may or not be made conical upon its inside, and rests upon and embraces the sides of the ribs $h$, formed upon the nut, as shown in Figs. 9 and 10.

Figure 11:
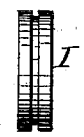

Fig. 10 shows the conical nut in section, while Fig. 11 shows a detached view of a regulating-nut, I, which is shown in position upon the end of the small barrel A in Fig. 7, and also in Figs. 1, 2, and 3. The purpose of this nut in each modification is to form a regulating-stopper for the backward motion of the conical nut in unlocking the barrels from each other, so that when the conical nut C is fully back against this nut I, and the small barrel is entered into the larger one, the extractors in each shall only come in contact with each other, whether by a whole or partial turn or revolution of the small barrels, at the moment the ring B has been fully expanded and compressed between the cone C and the inside walls of the larger barrels, thus leaving the two extractors in condition to operate together upon the cartridge while the barrel is held from being drawn out.

Figure 12:
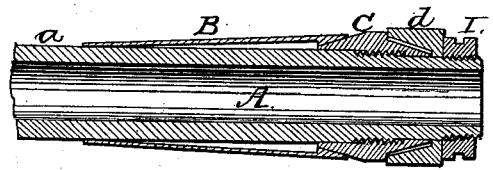
Figure 13:
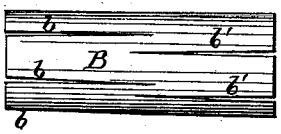
Figure 14:
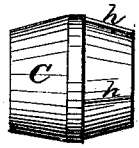

Figs. 12, 13, and 14 represent another modification of the same parts last described, only differing in this, that the expanding ring is firmly soldered or otherwise fastened to the small barrel and revolves with it. In this case the nut C is left without the pin $f$, so that the expanding ring B may revolve around the nut.

Figure 15:
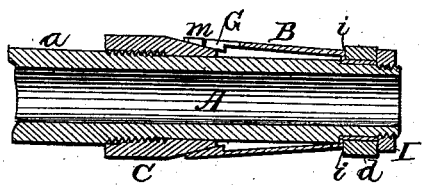
Figure 17:
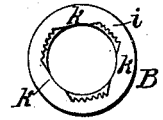

Figs. 15, 16, and 17 represent another modification of the same parts, in which the expanding ring and conical nut are reversed in their action, and the rubber packing placed upon a small cylinder, $s$, which projects from a shoulder, $i$, formed on the expanding ring, and portions of which are cut out, as shown in Fig. 17, the packing-ring $d$ being so constructed that while its outer periphery shall press upon the inside of the large barrel, and thus prevent rotary motion in the expanding ring B, the inside of the packing-ring will come down upon the small barrel, as shown more clearly in Fig. 17 at $k$, and thus, with portions of the cylinder, which it presses down upon the small barrel, prevent the passage of the gases of the charge backward. In this modification the conical nut is locked with the expanding ring by the lug $m$, Fig. 15, running in slot G, Fig. 16.

Figure 20:
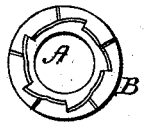
Figure 21:
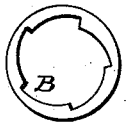
Figure 22:
Figure 23:
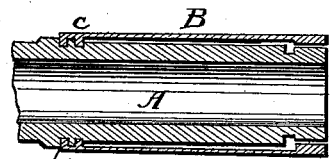

In Figs. 20 and 23, and which are detail views, is represented another modification, in which the ring B, at its expanding end, is formed with a single or a series of internally-projecting eccentric cam-faces, it being otherwise provided with slots $b\ b$ and $b'\ b'$, as in Fig. 13, and with a short slotted cylindrical end, S, of smaller diameter, as in the modification shown in Figs. 16 and 17, and on which is arranged the elastic packing-ring $d$. Upon the barrel A is formed a corresponding single or series of external eccentric cam-faces, which fit loosely when inserted in the ring B, and without expanding the ribs, and thus allows the ring with the short barrel to enter the larger one freely. Thus constructed, and the ring B firmly held to the larger barrel by the elastic packing-ring $d$, and the smaller barrel being then turned, the eccentric cam-faces on the latter, acting upon those of the ring B, will force the parts of the latter outward firmly against the large barrel, and thus dispense entirely with the conical nut C and the means used for operating it.

Figure 24:
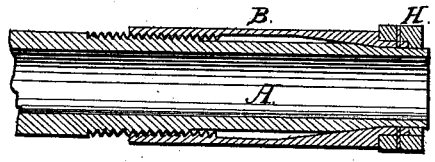

Fig. 24 represents another modification of the same devices. In this modification the expanding ring B is provided with a female screw-thread on the end next the breech of the gun, which takes into a male screw-thread cut upon the outside of the small barrel, while that portion of the latter near its end is made conical in form to operate upon inside cams formed upon the sectional portions of the expanding ring B, and which ring is provided with an elastic packing, to prevent its revolution inside of the larger barrel while the small barrel is being turned to move the expanding ring backward and forward, as may be desired. The elastic packing in this case should be firmly secured in any known way to the expanding ring.

In using my invention in the field, or when required, the regulating-nut I and cone C of the small barrel are first adjusted so that the latter bears firmly against the former, which leaves the ring unexpanded, ready for insertion in the bore of the large barrel. The gun is then opened, as if to insert a cartridge, instead of which, however, the small barrel is inserted, and so that its cartridge-extractor will bear upon, or else be in such relation to, the cartridge-extractor of the larger barrel that a single revolution or a partial revolution of the small barrel, and which is effected with a wrench, will firmly lock the small barrel to the inside of the large one at the moment when the extractors in each are so brought together that the extractor of the large barrel will operate the extractor of the small one, whereupon, on withdrawing the wrench, the gun is ready for use with the small barrel.

To remove the small barrel from the large one, I insert the wrench, turn it in a direction opposite to the direction employed to fasten it in, and the same distance back, and then pull upon the handle of the wrench. This will unlock the barrels and withdraw the small one from the larger, leaving the conical nut in the proper position with respect to the adjusting or stop nut I for another insertion, so that as it comes out it is ready for use again.

Having described my invention, what I claim as new, and desire to secure by Letters Patent, is—

1. The combination of the barrel A and expanding ring B, substantially as set forth.

2. The combination of the barrel A with the expanding ring B and conical nut C, or their equivalents, substantially as set forth.

3. The combination of the barrel A with the expanding ring B and conical nut C, or their equivalents, and elastic packing $d$, substantially as set forth.

4. The combination of the barrel A with the expanding ring B and conical nut C, or their equivalents, elastic packing $d$, and ring $e$, or their equivalents, substantially as set forth.

5. The combination of the short barrel A and elastic packing $d$ with the barrel J of a breech-loading fire-arm, substantially as set forth.

6. The combination of the short barrel A and expanding ring B with the barrel J of a breech-loading fire-arm, substantially as set forth.

7. The combination of a short barrel, A, expanding ring B, and conical nut C, or their equivalents, with the barrel of a breech-loading gun, substantially as described.

8. The combination of a short barrel, A, expanding ring B, and conical nut C, or their equivalents, and elastic ring $d$ with the barrel of a breech-loading shot-gun, substantially as set forth.

9. The combination of a short barrel, A, expanding ring B, conical nut C, or their equivalents, elastic packing $d$, and ring $e$, or their equivalent, with the barrel of a breech-loading shot-gun, substantially as set forth.

10. The combination of a short barrel, A, its extractor E, and elastic packing $d$ with the barrel and cartridge-extractor of a breech-loading gun, substantially as set forth.

11. The combination of a short barrel, A, expanding ring B, and extractor E with the barrel and cartridge-extractor of a breech-loading gun, substantially as described.

12. The combination of a short barrel, A, expanding ring B, conical nut C, or its equivalent, and extractor E with the barrel and cartridge-extractor of a breech-loading gun, substantially as set forth.

13. The combination of a short barrel, A, expanding ring B, conical nut C, or its equivalent, elastic packing $d$, and extractor E with the barrel and cartridge of a breech-loading gun, substantially as set forth.

14. The combination of a short barrel, A, expanding ring B, conical nut C, elastic packing $d$, adjusting-nut I, and extractor E with the barrel and cartridge-extractor of a breech-loading gun.

15. A conical nut, C, for use in connection with a breech-loading fire-arm, and a supplemental barrel, A, when said nut is provided with a screw-thread on its inner periphery, and with a base end of smaller diameter than its body, and said end milled or otherwise provided with ribs or teeth, in the manner substantially as and for the purposes set forth.

16. The combination of the elastic packing d and conical nut C with the barrel of a breech-loading fire-arm, substantially as set forth.

17. The combination of the packing-rings e and d, or their equivalents, substantially as shown and described, with nut C and supplemental barrel A, for the purpose set forth.

18. An expanding or expansible ring, B, formed of elastic material, and constructed with one or more longitudinal slots, b' b', substantially as and for the purpose set forth.

19. A small and removable gun-barrel, A, for use in connection with a breech-loading gun of a larger caliber, provided with notch n and grooves p, for the purposes set forth.

20. In combination with the barrel of a breech-loading fire-arm and a short barrel for insertion therein, a device, substantially as described, for firmly binding them together.

21. An auxiliary barrel, to be inserted within the barrel of a breech-loading gun, provided at its end with an expansible ring or collar, by which it is adjusted and secured to the outer barrel, substantially as set forth.

22. The combination of an auxiliary barrel, an outer barrel, and an expansible ring or collar for fitting the latter to the former.

23. A detachable rifle-barrel for breech-loading guns having an annular spring-collar seated between annular shoulders at the muzzle of the barrel, and adjusted to the bore of the gun-barrel by a screw-tap, substantially as described.

In testimony that I claim the foregoing as my own I affix my signature in presence of two witnesses.

JOHN BOWLES.

Witnesses:
  I. Y. KNIGHT,
  D. G. STUART.